Feb. 22, 1938.  L. E. WAGNER  2,108,835
APPARATUS FOR TESTING IGNITION CIRCUITS
Filed April 23, 1936
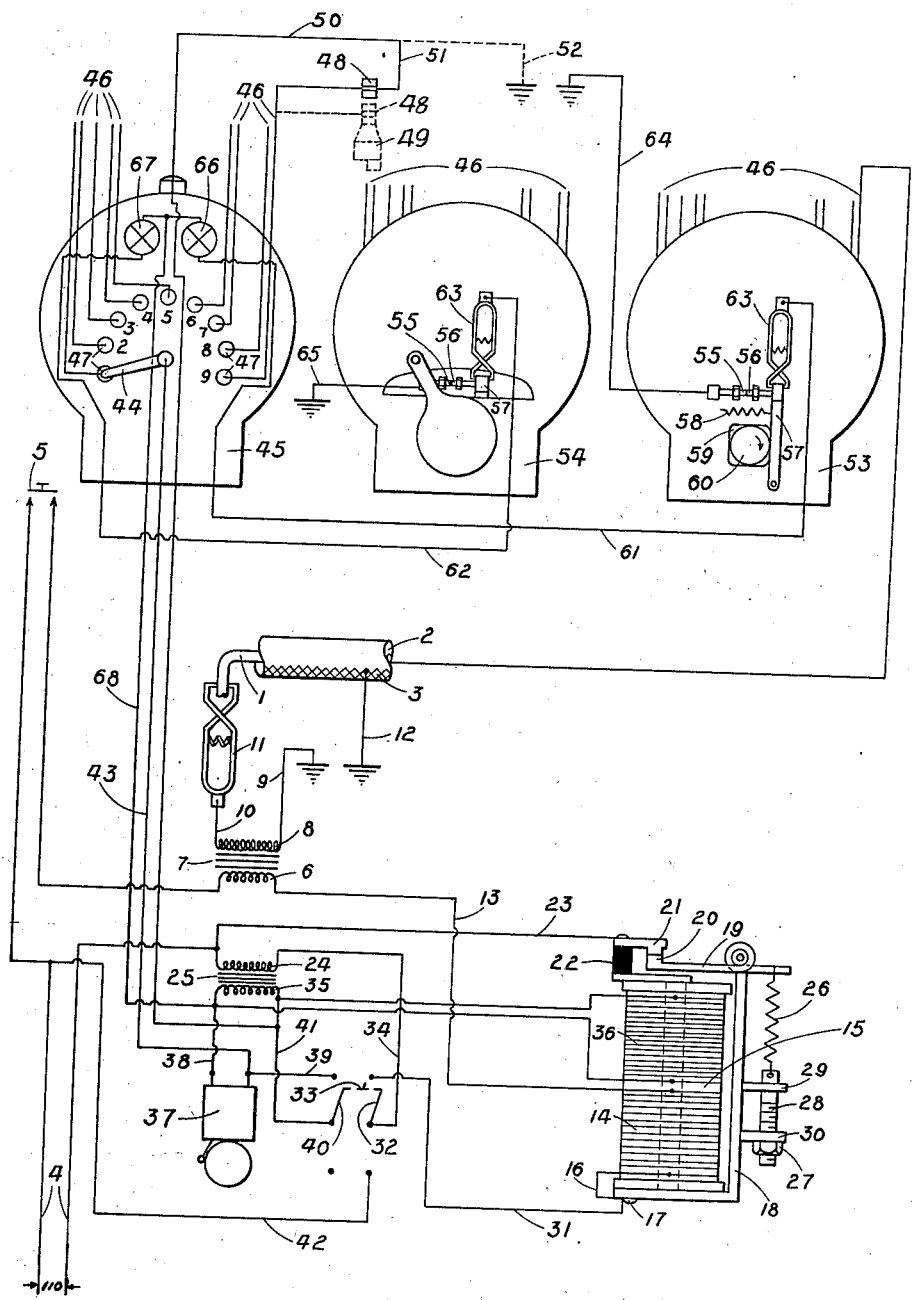
INVENTOR
LEWIS E. WAGNER
BY
Robert A. Lavender
ATTORNEY Patented Feb. 22, 1938

2,108,835

UNITED STATES PATENT OFFICE 2,108,835

APPARATUS FOR TESTING IGNITION CIRCUITS

Lewis E. Wagner, United States Navy

Application April 23, 1936, Serial No. 76,003

6 Claims. (Cl. 175—183)

(Granted under the act of March 3, 1883, as amended April 30, 1928; 370 O. G. 757)

This invention relates to apparatus for determining the continuity of the conducting path through an electric circuit element, the integrity of the insulation thereof, and the synchronization of normally synchronized cooperating circuit interrupting devices. It is particularly shown and described in connection with the ignition system of an aircraft having synchronized magnetos.

My invention has among its several objects:

To provide means to apply a high voltage to an insulated conductor that is inclosed in a conducting sheath to indicate whether there is leakage through the insulation;

To provide means for indicating the continuity, or failure thereof, through a wire, the distributor block, and the spark plug connection by which the wire is included in an ignition circuit;

To provide apparatus to indicate whether two magnetos that supply ignition current to common combustion chambers are properly in synchronism;

To provide means for testing the ignition system of an aircraft without removing the ignition harness and magnetos from their operative positions on the craft; and To provide a simple, compact, inexpensive, and reliable apparatus for testing ignition circuits in all the respects above specified.

The drawing shows schematically the salient features of the present invention.

Safety in aerial navigation requires that the ignition system of an aircraft be frequently checked and overhauled to detect in advance any defects that might lead to failure of the power plant while in the air. If for any reason an adequate spark is not supplied to each cylinder at the proper instant the output from the engine will be seriously diminished or, in some cases, it may cease entirely. Such failure of ignition may be due to leakage of the ignition current through faulty insulation or to interruption in the ignition lead due to breaking of the ignition cable or the separation of the cable from the distributor block or spark plug connection. Also, the time of firing may be incorrect due to lack of synchronism between the magnetos, each of which supplies ignition current to each cylinder. The present invention makes possible the rapid and accurate determination of the existence of any of the above mentioned defects without the necessity of dismantling the ignition system.

Referring to the drawing, the conducting wire 1 in an ignition cable is inclosed in insulation 2 which is covered by a conductive electric shielding 3 to prevent radio interference from the electric surges through conductor 1. One end of the conductor 1 is connected to a distributor block and the other end thereof is provided with a cap that engages the outer end of the center electrode of a spark plug. The shielding 3 is grounded to the engine, and, consequently, if the insulation 2 is defective or has been punctured, there will be leakage of the ignition current from conductor 1 to the engine frame and a sufficiently hot spark will not be formed in the combustion chamber.

The leads 4 are connected to any suitable source of alternating current and through the portable switch 5 the circuit from lead 4 may be closed to supply current to primary coil 6 of a high voltage transformer 7, the transformer ratio preferably being such that the output of secondary coil 8 is at 12,000 volts. One side of secondary 8 is grounded to the engine by wire 9 and the other side thereof is connected through wire 10 and spring clip 11 to the conductor 1. Cable shielding 3 is grounded to the engine through wire 12 and thus if there is leakage through insulation 2 the circuit through secondary 8 will be closed and current will flow through the primary 6. The side of primary 6 that is not connected to supply line 4 is connected by wire 13 to one terminal of series coil 14 of relay 15, the other terminal of coil 14 being connected by wire 16 to a screw 17 that secures armature bracket 18 to the relay assembly. Current that traverses coil 14 may pass through bracket 18 to armature 19 pivotally mounted thereon, through contact point 20 carried by armature 19 to the contact point 21 mounted on insulating block 22, and thence by wire 23 back to the supply line 4, the current through coil 14 being thus shunted around primary 24 of low voltage transformer 25. A spring 26 is engaged with armature 19 to retain the points 20 and 21 normally in contact, the tension of spring 26 being adjustable by nut 27 on threaded rod 28 connected to spring 26 and slidably mounted in apertures formed in ears 29 and 30 fixed to bracket 18. It is thus apparent that current passing through primary 6 of high voltage transformer 7 will, as long as points 20 and 21 are in contact, pass through coil 14, bracket 18, armature 19, the points 20 and 21, and wire 23 back to the supply line 4, the tension of spring 26 being so adjusted that the points 20 and 21 are kept closed against the pull of the magnetic field set up by current in coil 14 when no current is being drawn from the secondary of transformer 7. However, if there is leakage through insulation 2, there will be a circulation of current from secondary 8 through wire 10, clip 11, conductor 1, shielding 3, and thence through ground back to the secondary 8 and the additional current in primary 6 resulting from the flow of current through secondary 8 will sufficiently energize coil 14 to separate the points 20 and 21 and break the circuit in which the points are included.

When the points 20 and 21 are separated as above described the current through coil 14 will pass from screw 17 through wire 31, the right-hand blade 32 of double pole, double throw switch 33 which has been previously closed to be included in the circuit with wire 31, thence through wire 34 and primary 24 of transformer 25 to the supply line 4. The passage of current through primary 24 will induce a current in secondary 35 of transformer 25 to energize retaining coil 36 (which is connected across secondary 35) on relay 15 to keep points 20 and 21 separated. An indicator, which may be a bell 37, is connected to secondary 35 through wires 38 and 39, left-hand blade 40 of switch 33, and wire 41, it being remembered that during this test the switch 33 is closed upwardly. Therefore, if the insulation 2 is defective, the flow of current from secondary 8 of transformer 7 will be shown by the actuation of indicator 37 but if no indication is there given, the integrity of insulation 2 is unimpaired. Each of the ignition cables in turn is tested as above described and thus any cables that should be replaced are readily detected.

Faulty ignition sometimes occurs through breakage of conductor 1 in the ignition cable or through separation from the conductor of the distributor block secured to one end thereof or the separation therefrom of the cap secured to the other end thereof for connecting the cable to a spark plug electrode, any of which interrupts the continuity of the conducting path through the cable. To test for discontinuities the switch 33 is moved downwardly to connect blade 32 to wire 42 which closes a circuit from primary 24 of transformer 25 through wire 34 and switch 33 back to the supply line. One side of secondary 35 of transformer 25 is optionally connectible through wires 41 and 50 and connection 51 to cap 48 on wire 46, whereby wire 46 is connectible to a spark plug, and thence by the wire 46 to a contact on the dummy magneto 45. The other side of secondary 35 is connected through wire 38, indicator 37, and wire 43 to rotatable conductor arm 44 of a dummy magneto 45. The distributor block terminals on the several ignition cables 46 are connected, one to each of the contacts 47 on dummy magneto 45 with which the arm 44 may be brought selectively into contact. The cap 48 on the other end of each of the cables 46 is disconnected from its respective spark plug 49 (shown in dotted lines to indicate the normal operating connections) and is selectively brought into electrical contact with a lead 50 connected to the side of secondary 35 opposite that to which the wire 38 is connected. When arm 44 is brought into contact with the contact member 47 to which is connected an ignition cable 46 whereof the other end is connected to wire 50, it is evident that a circuit will be closed through secondary 35 of transformer 25 and the indicator 37 will be actuated if the conductive path through the cable 46 and the distributor block and cap 48 attached thereto is unbroken, but no indication will be given if the conductive path through the cable is interrupted.

The right-hand and the left-hand magnetos of an aircraft are designated by 53 and 54, respectively. As is well known in this art, each of these magnetos is connected by an ignition cable 46 to each of the cylinders of the aircraft engine so that if one magneto fails the other will suffice to keep the engine operating. At the proper time the magneto primary circuit is broken and a spark is produced between the electrodes of the spark plug connected to the wire which is at that time operatively associated with the circuit interrupter and the distributor. The construction and operation of the distributor used for this purpose are too well known to require further description. The circuit breaker, or circuit interrupter, comprises a fixed contact point 55 and a movable contact point 56 carried on an arm 57 that is normally held in circuit closing position by a spring 58 but is moved to separate the points at the proper time by a cam 59 on a shaft 60. It is essential that the circuit breakers operate at the some instant, otherwise irregularities in the timing of the explosions in the engine cylinders result and for this purpose the shafts 60 of the two magnetos are mechanically connected to insure synchronism of operation of the circuit breakers.

However, due to wear of some of the parts or to a gradual change in the adjustment of the mechanism, the circuit breakers may get out of synchronism. My present invention provides means for determining whether the circuits from the two magnetos are simultaneously interrupted.

For this purpose, the leads 61 and 62 are connected by spring clips 63 to the arms 57 of the circuit breakers and the points 55 are connected to ground by leads 64 and 65. The wires 61 and 62 connect lamps 66 and 67, respectively, in series with the circuit breakers and the lamps are connected in parallel to a wire 68 attached to one terminal of low voltage secondary 35. Wire 50 is connected to ground at 52, as indicated in dotted lines, and thus a circuit is completed through secondary 35, the circuit breakers on magnetos 53 and 54, and lamps 66 and 67, the circuit breakers and the lamps connected in series to each being in parallel. Shafts 60 are then rotated, preferably by means of the aircraft propeller and the shaft upon which it is mounted, which results in rotation of the shafts 60 and, at the proper time, the separation of the points 55 and 56 in the two circuit breakers. It is apparent from the foregoing that when the breaker points are separated the lights 66 and 67 will go out and if the two magnetos are synchronized the lights 66 and 67 will be extinguished simultaneously but, if there is any difference in the time of interruption of the two circuits, that will be indicated by the light in the circuit that is broken later continuing to function after the other one has become dark. The lights 66 and 67 have the same relative positions as do the magnetos 53 and 54 to which they are respectively connected and it is, therefore, easy to determine which of the circuits was first interrupted when there is a difference in the time of such interruption.

All of the above tests are performed without disassembling any of the elements from the engine, to which all ground connections are made.

This invention may be manufactured and used by or for the Government of the United States of America for governmental purposes without the payment of any royalties thereon or therefor.

I claim:

1. A testing apparatus as described, comprising a high voltage transformer, a low voltage transformer; a relay including separable contact points, a first coil on said relay connected in series with the primary of the high voltage transformer to separate said points when current is drawn from the coacting secondary, said coil being connected in series with the primary of the low voltage transformer when the said points are open but shunted around the low voltage primary when the points are closed, a second coil on said relay connected across the secondary of the low voltage transformer to retain said points separated when moved apart as aforesaid; an indicator operatively connected to the secondary of the low voltage transformer when said first coil is in series with the primary of the low voltage transformer, means for selectively connecting the secondary of the low voltage transformer and said indicator in circuit with any one of a plurality of electric circuit elements to be tested, and means for supplying current from said low voltage secondary to a plurality of parallel electric circuits each of which includes a circuit interrupting device and an indicating device, said interrupting devices being mechanically connected together to be operable in synchronism.

2. A testing apparatus as described, comprising a high voltage transformer, a low voltage transformer; a relay including separable contact points, a first coil on said relay connected in series with the primary of the high voltage transformer to separate said points when current is drawn from the coacting secondary, said coil being connected in series with the primary of the low voltage transformer when the said points are open but shunted around the low voltage primary when the points are closed, a second coil on said relay connected across the secondary of the low voltage transformer to retain said points separated when moved apart as aforesaid; an indicator operatively connected to the secondary of the low voltage transformer when said first coil is in series with the primary of the low voltage transformer, and means for selectively connecting the secondary of the low voltage transformer and said indicator in circuit with any one of a plurality of electric circuit elements to be tested.

3. A testing apparatus as described, comprising a high voltage transformer, a low voltage transformer; a relay including separable contact points, a first coil on said relay connected in series with the primary of the high voltage transformer to separate said points when current is drawn from the coacting secondary, said coil being connected in series with the primary of the low voltage transformer when the said points are open but shunted around the low voltage primary when the points are closed, a second coil on said relay connected across the secondary of the low voltage transformer to retain said points separated when moved apart as aforesaid; an indicator operatively connected to the secondary of the low voltage transformer when said first coil is in series with the primary of the low voltage transformer, and means for supplying current from said low voltage secondary to a plurality of parallel electric circuits each of which includes a circuit interrupting device and an indicating device, said interrupting devices being mechanically connected together to be operable in synchronism.

4. A testing apparatus as described, comprising a transformer having a primary and a high voltage secondary, means to connect one terminal of said secondary to a conductor, means to connect the other terminal of the secondary to ground, means to connect electrical shielding around insulation on said conductor also to ground, a transformer having a low voltage secondary; a relay including a pair of separable but normally closed contact points, a first coil and a second coil; means connecting said second coil across the secondary of said low voltage transformer, means connecting said first coil in series with the primaries of both of said transformers when said points are separated, means including said points to shunt said first coil around the primary of the low voltage transformer when said points are closed, whereby when current is drawn from the secondary of the high voltage transformer the extra current thus drawn through the primary thereof will set up a field in said first coil to separate said points and cause a flow of current through the primary of said low voltage transformer, thereby energizing said second coil to hold said points separated, and an indicator connected to be actuated by current from the secondary of said low voltage transformer.

5. A testing apparatus as described, comprising a high voltage transformer, a low voltage transformer; a relay including separable contact points, a first coil on said relay connected in series with the primary of the high voltage transformer to separate said points when current is drawn from the coacting secondary, said coil being connected in series with the primary of the low voltage transformer when the said points are open but shunted around the low voltage primary when the points are closed, a second coil on said relay connected across the secondary of the low voltage transformer to retain said points separated when moved apart as aforesaid; an indicator operatively connected to the secondary of the low voltage transformer when said first coil is in series with the primary of the low voltage transformer, and a load circuit in series with said indicator and the secondary of said low voltage transformer.

6. A testing apparatus as described, comprising a high voltage transformer, a low voltage transformer; a relay including separable contact points, a first coil on said relay connected in series with the primary of the high voltage transformer to separate said points when current is drawn from the coacting secondary, said coil being connected in series with the primary of the low voltage transformer when the said points are open but shunted around the low voltage primary when the points are closed, a second coil on said relay connected across the secondary of the low voltage transformer to retain said points separated when moved apart as aforesaid and an indicator operatively connected to the secondary of the low voltage transformer.

LEWIS E. WAGNER.